United States Patent [19]

Goto et al.

[11] Patent Number: 4,591,714
[45] Date of Patent: May 27, 1986

[54] LIGHT GUIDE MEMBER FOR RADIATION IMAGE READ-OUT

[75] Inventors: Chiaki Goto; Kazuo Horikawa; Masaru Noguchi, all of Kanagawa, Japan

[73] Assignee: Fuji Photo Co., Ltd., Minami-ashigara, Japan

[21] Appl. No.: 711,167

[22] Filed: Mar. 13, 1985

[30] Foreign Application Priority Data

Mar. 15, 1984 [JP] Japan .................................. 59-50025

[51] Int. Cl.$^4$ .............................................. G02B 6/00
[52] U.S. Cl. ................................ 250/327.2; 250/227; 250/484.1; 358/200
[58] Field of Search ................... 250/327.2, 484.1, 227; 350/172, 171, 170; 358/75, 199, 200

[56] References Cited

U.S. PATENT DOCUMENTS

| | | | |
|---|---|---|---|
| 4,258,264 | 3/1981 | Kotera et al. | 250/484.1 |
| 4,315,318 | 2/1982 | Kato et al. | 364/515 |
| 4,346,295 | 8/1982 | Tanaka et al. | 250/327.2 |
| 4,454,424 | 6/1984 | Strauss et al. | 250/390 |
| 4,485,302 | 11/1984 | Tanaka et al. | 250/327.2 |
| 4,495,412 | 1/1985 | Thoone et al. | 250/227 |

Primary Examiner—Alfred E. Smith
Assistant Examiner—Constantine Hannaher
Attorney, Agent, or Firm—Gerald J. Ferguson, Jr.

[57] ABSTRACT

A light guide member comprises three optical blocks. The first optical block is provided with a light input face positioned close to and approximately in parallel with a stimulable phosphor sheet carrying a radiation image stored therein, and a light output face parallel with the light input face. The second optical block is provided with a light input face slightly spaced apart from the light output face of the first optical block, a dichroic optical plane extending upward from one end of the light input face at an angle of approximately 45°, and a light output face extending downward from an upper end of the dichroic optical plane. The dichroic optical plane transmits stimulating rays and reflects light emitted by the stimulable phosphor sheet upon exposure to stimulating rays. The third optical block is provided with a light input face slightly spaced apart from the light output face of the second optical block, and upper and lower total reflection planes extending horizontally from upper and lower ends of the light input face.

8 Claims, 7 Drawing Figures

LIGHT GUIDE MEMBER FOR RADIATION IMAGE READ-OUT

BACKGROUND OF THE INVENTION

1. Field of the Invention

This invention relates to a light guide member for guiding light emitted by a stimulable phosphor sheet to a photodetector during the image read-out step in a radiation image recording and reproducing system wherein the stimulable phosphor sheet is exposed to a radiation passing through an object to have a radiation image stored therein, the stimulable phosphor sheet carrying the radiation image stored therein is scanned by stimulating rays which cause it to emit light in proportion to the radiation energy stored, the emitted light is photoelectrically detected and converted to an electric image signal, and a visible image is reproduced by use of the electric image signal.

2. Description of the Prior Art

The radiation image recording and reproducing system as described above is disclosed, for example, in U.S. Pat. Nos. 4,258,264 and 4,315,318, and Japanese Unexamined Patent Publication No. 56(1981)-11395. The radiation image recording and reproducing system was also described in "Nikkan Kogyo Shinbun" (Daily Industrial Newspaper), June 23, 1981 edition, page 16. The light guide member used for image read-out in the radiation image recording and reproducing system is disclosed, for example, in U.S. Pat. No. 4,346,295.

In order to improve the light guiding efficiency of the light guide member and to realize efficient image read-out with a small apparatus, the applicant proposed a novel light guide member provided with a dichroic optical plane in Japanese Patent Application No. 58(1983)-218678. However, a need exists for a light guide member further improved in design. FIGS. 1 and 2 are sectional side views showing embodiments of the light guide member described in Japanese Patent Application No. 58(1983)-218678, and FIG. 3 is an enlarged view of FIG. 1. In the embodiments of FIGS. 1 and 2, stimulating rays entering the light guide member in the direction as indicated by the arrow A cause the stimulable phosphor sheet to emit light in the directions as indicated by the arrows B1, B2 and C. The light emitted in the directions as indicated by the arrows B1 and B2 are reflected efficiently and guided inside of the light guide member. However, the light emitted in the direction as indicated by the arrow C comes out of the upper surface of a block 1. The light guide member as shown in FIG. 1 is advantageous over the light guide member as shown in FIG. 2 in that a photodetector such as a photomultiplier can be easily connected to the end portion of the block 1. On the other hand, the latter is advantageous over the former in that the height of the apparatus can be made small and the size of the whole apparatus can be decreased.

Further, as shown in FIG. 3, the embodiment of FIG. 1 is disadvantageous in that some components of the light emitted by the stimulable phosphor sheet come out of the light guide member as indicated by the arrows D and E. Thus it is desired to further improve the light guiding efficiency.

SUMMARY OF THE INVENTION

The primary object of the present invention is to provide a light guide member exhibiting an improved light guiding efficiency by preventing the light emitted by a stimulable phosphor sheet from escaping from the light guide member.

Another object of the present invention is to provide a light guide member which has a light output end spaced apart from the stimulable phosphor sheet and which is easily connected to a photodetector.

The light guide member for radiation image read-out in accordance with the present invention comprises a first optical block having a light input face standing face to face with a stimulable phosphor sheet, a second optical block having a dichroic optical plane, and a third optical block having a light output face. The optical blocks are positioned adjacent to each other via small spaces for generating total reflection planes therebetween, so that light components C, D and E coming out of the light guide member as shown in FIG. 3 are entirely reflected by the total reflection planes and are guided inside of the light guide member. That is, in the present invention, boundary spaces (air gaps for total reflection) are formed horizontally from the lower end of the dichroic optical plane in the example of FIG. 3 and vertically downwardly from the upper end thereof, and the light coming out of the light guide member is reflected at the boundary spaces inwardly of the light guide member.

In the light guide member of the present invention, since the horizontal and vertical total reflection planes are positioned adjacent the dichroic optical plane by forming the air gaps, the light emitted by the stimulable phosphor sheet and reflected by the dichroic optical plane is entirely reflected by the total reflection planes and is prevented from coming out of the light guide member. Therefore, it is possible to obtain a high light guiding efficiency.

DESCRIPTION OF THE PREFERRED EMBODIMENTS

The present invention will hereinbelow be described in further detail with reference to the accompanying drawings.

Figure 4:
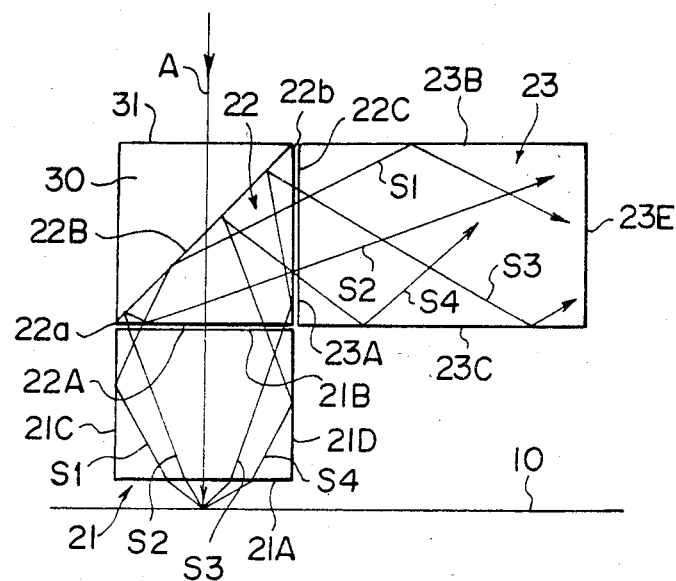
FIG. 4 is a side sectional view showing an embodiment of the light guide member in accordance with the present invention.

Referring to FIG. 4, the light guide member in accordance with the present invention comprises a first optical block 21, a second optical block 22, and a third optical block 23. The first optical block 21 is provided with a light input face 21A positioned close to and approximately in parallel with a stimulable phosphor sheet 10 carrying a radiation image stored therein to stand face to face therewith, a light output face 21B approximately parallel with the light input face 21A, a front total reflection plane 21C and a rear total reflection plane 21D extending vertically between the light input face 21A and the light output face 21B, and right and left total reflection planes extending vertically between the light input face 21A and the light output face 21B (only one of the right and left total reflection planes is designated by 21E in FIGS. 5 and 6). The second optical block 22 is provided with a light input face 22A standing face to face with the light output face 21B of the first optical block 21 via a small space 22a, a dichroic optical plane 22B extending upward obliquely from one end of the light input face 22A at an angle of approximately 45° with respect to the light input face 22A, the dichroic optical plane 22B transmitting the stimulating rays A and reflecting the light S1 to S4 emitted by the stimulable phosphor sheet 10, a light output face 22C extending vertically downward from an upper end of the dichroic optical plane 22B to the light input face 22A, and right and left total reflection planes extending vertically (only one of the right and left total reflection planes is designated by 22D in FIGS. 5 and 6). The third optical block 23 is provided with a light input face 23A standing face to face with the light output face 22C of the second optical block 22 via a small space 22b, an upper total reflection plane 23B extending approximately horizontally from the upper end of the light input face 23A, a lower total reflection plane 23C extending approximately horizontally from the lower end of the light input face 23A, two side faces forming right and left total reflection planes between the upper total reflection plane 23B and the lower total reflection plane 23C (only one of the side faces is designated by 23D in FIGS. 5 and 6), and a light output face 23E opposite to the light input face 23A. A triangular prism block 30 having a stimulating ray input face 31 normal to the stimulating rays A is closely contacted with the outer face of the dichroic optical plane 22B.

The stimulating rays A entering from the stimulating ray input face 31 of the triangular prism block 30 pass through the dichroic optical plane 22B, the second optical block 22, the space 22a and the first optical block 21, and impinge upon the stimulable phosphor sheet 10. When exposed to the stimulating rays A, the stimulable phosphor sheet 10 emits light as indicated by S1 to S4. The light component emitted by the stimulable phosphor sheet 10, entering from the light input face 21A and reflected by the front plane 21C of the first optical block 21 passes through the space 22a, and is then reflected by the dichroic optical plane 22B as indicated by S1. The light component S1 then passes through the space 22b, enters the third optical block 23, and is guided inside of the third optical block 23 by total reflection. The light component S2 entering from the light input face 21A and passing through the space 22a to the dichroic optical plane 22B without being reflected by the front plane 21C of the first optical block 21 is entirely reflected by the light input face 22A of the second optical block 22 after being reflected by the dichroic optical plane 22B. Then the light component S2 passes through the space 22B, enters the third optical block 23, and is guided inside of the third optical block 23 by total reflection. The light component S3 entering from the light input face 21A and passing through the space 22a to the light output face 22C of the second optical block 22 without being reflected by the rear plane 21D of the first optical block 21 is entirely reflected by the light output face 22C and then by the dichroic optical plane 22B. Then, the light component S3 passes through the space 22b, enters the third optical block 23, and is guided inside of the third optical block 23 by total reflection. The light component S4 entering from the light input face 21A, totally reflected by the rear plane 21D of the first optical block 21, and passing through the space 22a to the dichroic optical plane 22B passes through the space 22b after being reflected by the dichroic optical plane 22B, enters the third optical block 23, and is guided inside of the third optical block 23 by total reflection.

Figure 1:
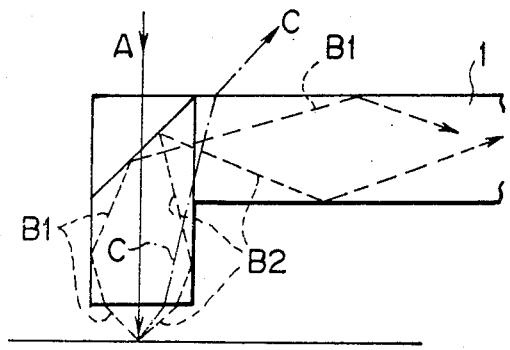
FIGS. 1 and 2 are side sectional views showing examples of the conventional light guide member used for radiation image read-out.
Figure 2:
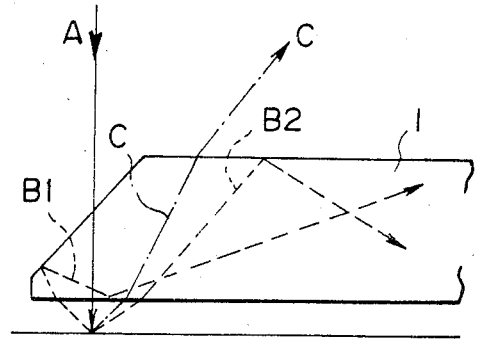
Figure 3:
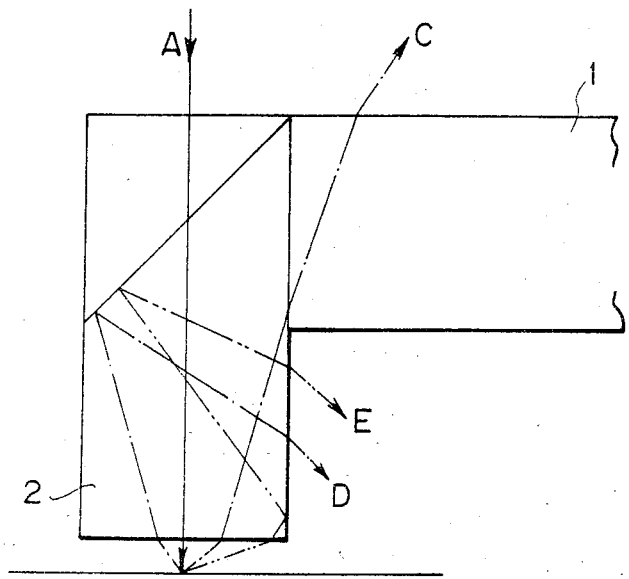
FIG. 3 is an enlarged view of FIG. 1.

As described above, the components S1 to S4 of the light emitted by the stimulable phosphor sheet 10 impinge upon the dichroic optical plane 22B, enter the third optical block 23, and are guided inside of the third optical block 23 by total reflection up to the light output face 23E of the third optical block 23. Therefore, the light guiding efficiency of the light guide member is markedly improved over that of the light guide members as shown in FIGS. 1 and 3.

Figure 5:
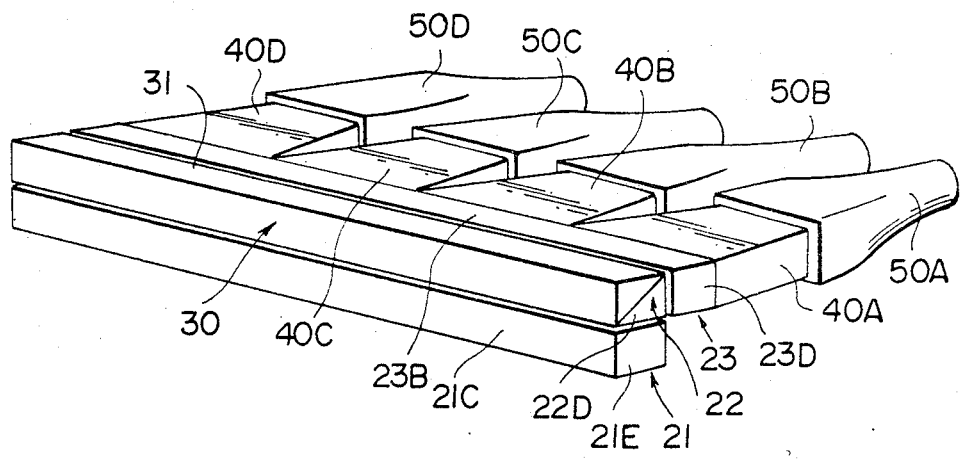
FIGS. 5 and 6 are perspective views showing the light guide member of FIG. 4 used together with a photodetector.

In FIG. 5, the light guide member is extended in the width direction of the stimulable phosphor sheet 10, and the light output face 23E of the third optical block 23 is optically connected to light guiding blocks 40A, 40B, 40C and 40D. The light output ends of the blocks 40A to 40D are closely contacted with photomultipliers 50A, 50B, 50C and 50D.

Figure 6:
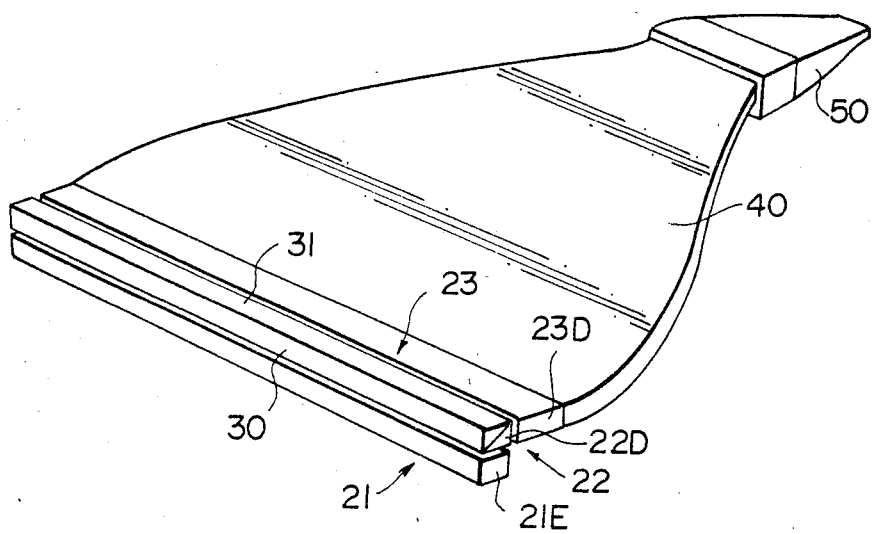

In FIG. 6, a single light guiding block 40 is optically connected to the light output face 23E of the third optical block 23 of FIG. 5, and a photomultiplier 50 is closely contacted with the light output end of the light guiding block 40.

The light guiding blocks 40A to 40D in FIG. 5 and the light guiding block 40 in FIG. 6 are prism blocks having the upper, lower, right and left faces constituted by total reflection planes, or prism blocks having the upper and lower faces constituted by total reflection planes, and the right and left faces provided with reflection films.

In order to facilitate separation from the light emitted by the stimulable phosphor sheet 10 upon stimulation thereof, the wavelength distribution of the stimulating rays should be different from and far apart from the wavelength distribution of the light emitted by the stimulable phosphor sheet 10. Namely, the spectrum of the stimulating rays should not overlap the spectrum of the light emitted by the stimulable phosphor sheet 10. Accordingly, the stimulating rays should preferably be a He-Ne laser beam (633 nm), a YAG laser beam (1064 nm), a ruby laser beam (694 nm), a semiconductor laser beam (infrared rays), or the like, which has a wavelength longer than that of the light emitted by the stimulable phosphor sheet 10.

Figure 7:
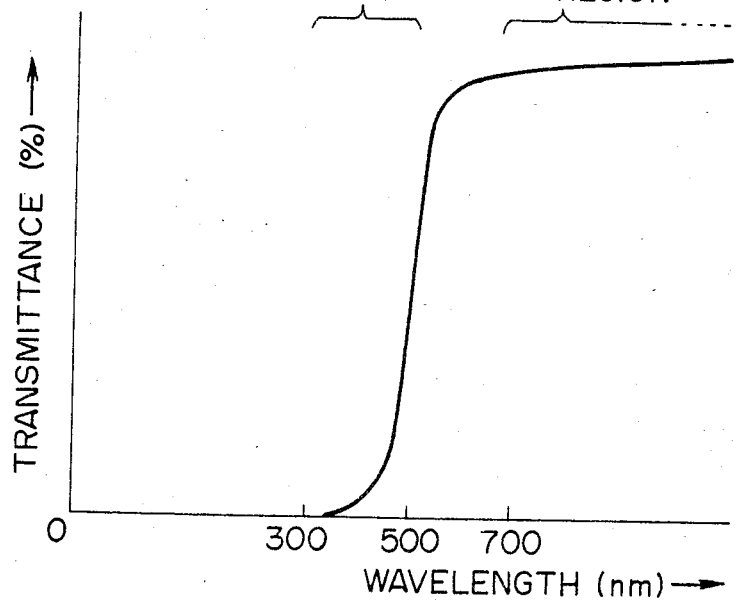
FIG. 7 is a graph showing the spectral transmittance of the dichroic optical plane used in the present invention.

Therefore, the dichroic optical plane 22B should exhibit the spectral transmittance as shown in FIG. 7 (when the angle of incidence is 45°). That is, it should transmit the stimulating rays A having a long wavelength, and reflects the light having a short wavelength (e.g. 300 nm to 500 nm) emitted by the stimulable phosphor sheet 10. Such a dichroic optical plane is fabricated, for example, of a plurality of layers of films of a high refractive index material and a low refractive index material. When the triangular prism block 30 is closely contacted with the dichroic optical plane 22B, the block 30 is optically joined with the multi-layer optical plane.

We claim:

1. A light guide member for radiation image readout, which comprises:
   (i) a first optical block provided with a light input face positioned close to and approximately in parallel with a stimulable phosphor sheet carrying a radiation image stored therein to stand face to face therewith, a light output face approximately parallel with said light input face, and four side faces constituting front, rear, right and left total reflection planes between said light input face and said light output face, (ii) a second optical block provided with a light input face standing face to face with said light output face of said first optical block via a small space, a dichroic optical plane extending upward obliquely from one end of said light input face of said second optical block at an angle of approximately 45° with respect to said light input face, said dichroic optical plane transmitting stimulating rays and reflecting light emitted by said stimulable phosphor sheet upon exposure to the stimulating rays, a light output face extending downward from an upper end of said dichroic optical plane to said light input face of said second optical block, and two side faces constituting right and left total reflection planes among said light input face, said dichroic optical plane and said light output face, and (iii) a third optical block provided with a light input face standing face to face with said light output face of said second optical block via a small space, an upper total reflection plane extending approximately horizontally from an upper end of said light input face of said third optical block, a lower total reflection plane extending approximately horizontally from a lower end of said light input face, two side faces constituting right and left total reflection planes between said upper total reflection plane and said lower total reflection plane, and a light output face opposite to said light input face.

2. A light guide member as defined in claim 1 wherein the outer surface of said dichroic optical plane is closely contacted with a triangular prism block having a stimulating ray input face normal to said stimulating rays.

3. A light guide member as defined in claim 1 wherein said light guide member extends in the width direction of said stimulable phosphor sheet, and said light output face of said third optical block is optically connected to a plurality of light guiding blocks having light output ends connected to photodetectors.

4. A light guide member as defined in claim 3 wherein said light guiding blocks are prism blocks having total reflection planes at the upper, lower, right and left faces.

5. A light guide member as defined in claim 3 wherein said light guiding blocks are prism blocks having total reflection planes at the upper and lower faces, and reflection films at the right and left faces.

6. A light guide member as defined in claim 1 wherein said light guide member extends in the width direction of said stimulable phosphor sheet, and said light output face of said third optical block is optically connected to a single light guiding block having a light output end connected to a single photodetector.

7. A light guide member as defined in claim 6 wherein said light guiding block is a prism block having total reflection planes at the upper, lower, right and left faces.

8. A light guide member as defined in claim 6 wherein said light guiding block is a prism block having total reflection planes at the upper and lower faces, and reflection films at the right and left faces.

* * * * *